US011519601B2

(12) United States Patent
Dunnu et al.

(10) Patent No.: US 11,519,601 B2
(45) Date of Patent: Dec. 6, 2022

(54) SYSTEM AND METHOD FOR INERTING A BIOMASS FEED ASSEMBLY

(71) Applicant: GENERAL ELECTRIC COMPANY, Schenectady, NY (US)

(72) Inventors: Gregory Dunnu, Nuertingen (DE); Hellmuth Brüggemann, Esslingen (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 115 days.

(21) Appl. No.: 16/814,233

(22) Filed: Mar. 10, 2020

(65) Prior Publication Data
US 2021/0285636 A1 Sep. 16, 2021

(51) Int. Cl.
F23G 7/10 (2006.01)
F23G 5/44 (2006.01)
F23G 5/46 (2006.01)

(52) U.S. Cl.
CPC ............ F23G 7/105 (2013.01); F23G 5/442 (2013.01); F23G 5/46 (2013.01); F23G 2209/261 (2013.01); F23K 2203/102 (2013.01); F23L 2900/07002 (2013.01)

(58) Field of Classification Search
CPC .... F23G 7/105; F23G 5/442; F23G 2209/261; F23K 2203/102; F23L 2900/07002
See application file for complete search history.

(56) References Cited

U.S. PATENT DOCUMENTS

| 3,669,502 | A | | 6/1972 | Leman | |
|---|---|---|---|---|---|
| 4,230,528 | A | * | 10/1980 | Jagnow | C10B 49/16 201/22 |
| 5,315,940 | A | * | 5/1994 | Kasseck | F23K 1/04 431/353 |
| 5,667,279 | A | | 9/1997 | Christopher et al. | |
| 5,765,365 | A | | 6/1998 | Fujioka et al. | |
| 6,802,268 | B2 | * | 10/2004 | Kroemmer | C21B 7/22 110/189 |
| 9,890,331 | B2 | | 2/2018 | Mizokoshi et al. | |
| 10,011,799 | B2 | * | 7/2018 | Lawrence | C10L 5/14 |
| 2011/0024136 | A1 | | 2/2011 | Heisei et al. | |
| 2011/0139047 | A1 | | 6/2011 | Takase et al. | |
| 2013/0247800 | A1 | * | 9/2013 | Higgins | F23G 5/04 110/118 |
| 2017/0001802 | A1 | * | 1/2017 | Ciliberti, Jr. | C10J 3/26 |
| 2019/0233373 | A1 | | 8/2019 | Witt et al. | |
| 2020/0009521 | A1 | * | 1/2020 | Seshadri | F23C 10/22 |
| 2021/0238490 | A1 | * | 8/2021 | Urakata | F02C 3/28 |

* cited by examiner

Primary Examiner — David J Laux
(74) Attorney, Agent, or Firm — Grogan, Tuccillo & Vanderleeden, LLP

(57) ABSTRACT

A system for inerting a biomass feed assembly the system including a combustion chamber operably connected to the biomass feed assembly to receive a biofuel, the combustion chamber operable to combust the biofuel and generate a flue gas therefrom and a conduit operably coupled to at least one of the combustion chamber and an inert gas source, and the biomass feed assembly, the conduit operable to carry a gas to the biomass feed assembly. The gas sweeps dust generated in at least the gravity chute assembly toward the combustion chamber and the gas maintains an oxygen partial pressure or concentration in the at least a portion of the biomass feed assembly below a selected threshold sufficient to suppress ignition.

18 Claims, 3 Drawing Sheets

SYSTEM AND METHOD FOR INERTING A BIOMASS FEED ASSEMBLY

BACKGROUND

Technical Field

Embodiments of the invention relate generally to energy production, and more specifically, to a system and method to inert at least the gravity chute assembly of a biofuel feed assembly to prevent flashback, backfire, and dust explosion.

Discussion of Art

As demand for renewable energy sources continues to grow, biofuels are increasingly used in the production of energy. In particular, many electrical power plants, also referred to hereinafter simply as "power plants," burn biofuels to produce steam, which in turn powers a steam turbine generator. In many such power plants, the biofuel is burned on a stoker grate within a combustion chamber.

Existing pneumatic spreaders are commonly deployed for use for fuels with high moisture content in them and as such have no concern of dust related explosion in the gravity-chute area. The burning of dry biomass fuels, may result in dust cloud of fine biomass particles particularly in the hopper, screw feeder and gravity chute when the feeder is in service. Fine biofuel particles, which by their nature are very reactive fuels, may pose a risk of explosion.

What is needed, therefore, is an improved system and method for firing a biofuel where the risk of explosion or backfire or flashback in the gravity chute assembly is reduced when burning dry reactive biomass such as dry wood pellets.

BRIEF DESCRIPTION

Described herein, in an embodiment is a system for inerting a biomass feed assembly. The system includes a biomass feed assembly having a biofuel a combustion chamber operably connected to the biomass feed assembly to receive the biofuel, the combustion chamber operable to combust the biofuel and generate a flue gas therefrom and a conduit operably coupled to at least one of the combustion chamber and an inert gas source, and the biomass feed assembly. In addition to one or more of the features described above, or as an alternative, further embodiments may include, that at least one of an inert gas or the flue gases generated by combustion in the combustion chamber are introduced to the biomass feed assembly and mixed with the biofuel. Furthermore, in addition to one or more of the features described above, or as an alternative, further embodiments may also include, that the gas sweeps dust generated in at least a portion of the biomass feed assembly toward the combustion chamber. Moreover, further embodiments may include one or more of the features described above, or as an alternative, that the gas maintains an oxygen partial pressure or concentration in the at least a portion of the biomass feed assembly below a selected threshold sufficient to suppress ignition.

Also described herein is a method of inerting a biofuel in biomass feed assembly operably connected to a combustion chamber. The method includes receiving an inerting gas at the biomass feed assembly, injecting the inerting gas with the biofuel in at least a portion of the biomass feed assembly. Furthermore, in addition to one or more of the features described above, or as an alternative, further embodiments may also include, that the gas sweeps dust generated in at least a portion of the biomass feed assembly toward the combustion chamber. Moreover, further embodiments may include one or more of the features described above, or as an alternative, that the gas maintains an oxygen partial pressure or concentration in the at least a portion of the biomass feed assembly below a selected threshold sufficient to suppress ignition.

Additional features and advantages are realized through the techniques of the present disclosure. Other embodiments and aspects of the disclosure are described in detail herein. For a better understanding of the disclosure with the advantages and the features, refer to the description and to the drawings.

DRAWINGS

The described embodiments will be better understood from reading the following description of non-limiting embodiments, with reference to the attached drawings, wherein below:

DETAILED DESCRIPTION

Figure 1:
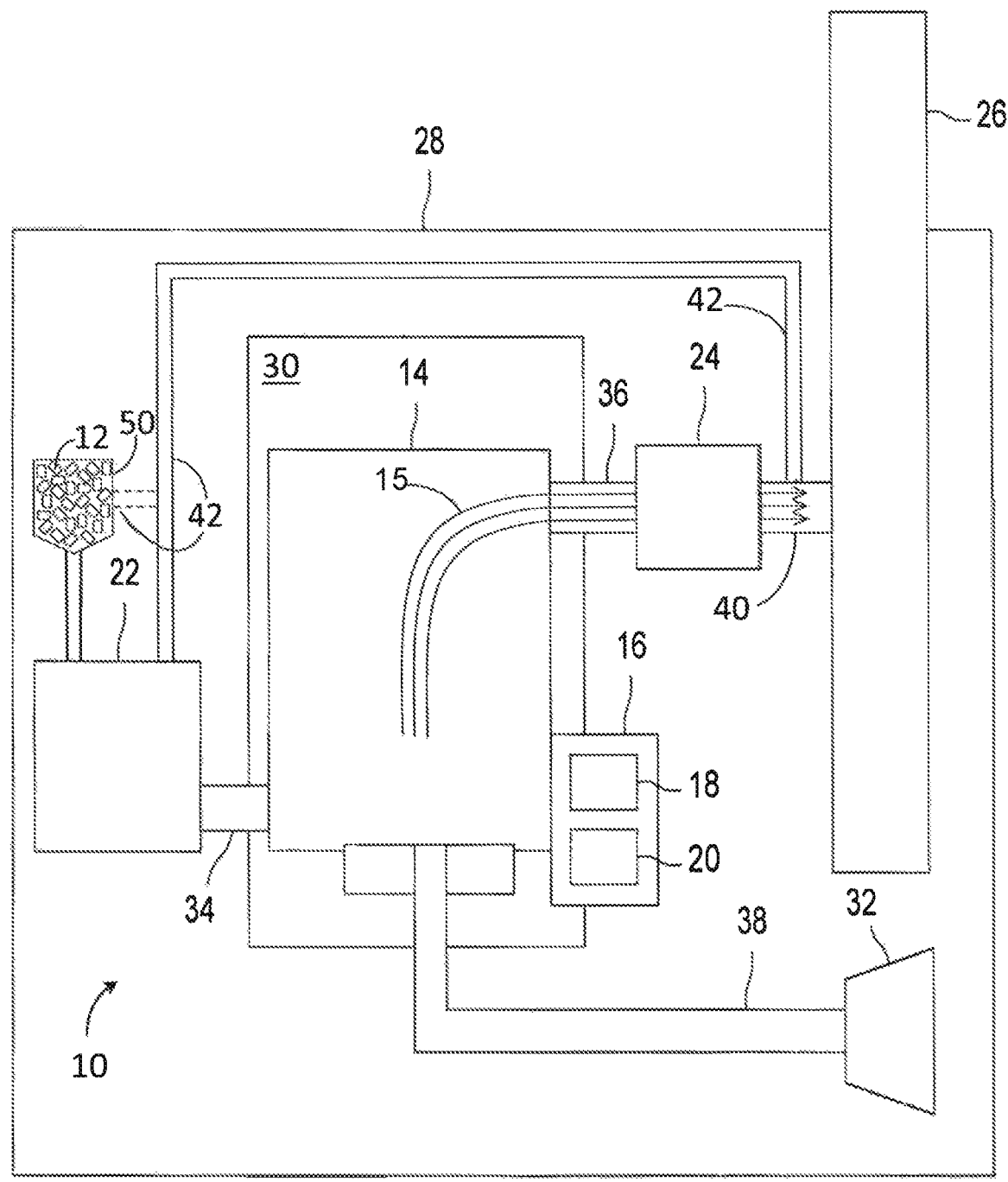
FIG. 1 is a block diagram of a system for firing a biofuel, in accordance with an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description. While the various embodiments as described herein are suitable for use with combustion systems, generally, a biomass spreader stoker, such as for use in a biomass fueled power plant has been selected and described for clarity of illustration. Other combustion systems may include other types of boilers, furnaces and fired heaters utilizing a wide range of fuels including, but not limited to, biomass, sawgrass, coal and the like. For example, contemplated boilers include, but are not limited to, circulating fluidized bed (CFB) and bubbling fluidized bed (BFB) boilers, stoker boilers, suspension burners for biomass boilers, dutch oven boilers, hybrid suspension grate boilers, and fire tube boilers. In addition, other combustion systems may include, but are not limited to, kiln, incinerator, fired heater and glass furnace combustion systems.

As used herein, the terms "substantially," "generally," and "about" indicate conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. Furthermore, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid and/or gas flowing between and/or near the referenced elements. Further, the term "stream," as used herein with respect to particles, means a continuous or near continuous flow of particles. As also used herein, the term "heating contact" means that the referenced objects are in proximity of one another such that heat/thermal energy can transfer between them. As further used herein, the terms "suspended state combustion" refers to the process of combusting a fuel suspended in air.

Described herein in one or more exemplary embodiments is a biomass feed assembly including a hopper, feeder, and a spreader-stoker for biomass fuel applications, that is continuously inerted through the injection of recirculated flue gas or inert gas or steam. The recirculated flue gas or inert gas or steam sweeps the generated dust away to the combustion chamber 14 and at the same time suppressing the oxygen partial pressure or concentration inside the gravity-chute assembly upstream the spreader spout to non-explosive level. As a result, the risk of explosion, backfire, or flashback in the gravity chute assembly is reduced when burning dry reactive biomass such as wood pellets. Additionally, while the embodiments disclosed herein are primarily described with respect to combustion systems and power plants, it is to be understood that embodiments of the invention may be applicable to any apparatus and/or method that needs to limit and/or eliminate explosion risk resulting from dust or the combustion of a biofuel, e.g., an incinerator and the like.

Referring now to FIG. 1, a system 10 for firing a biofuel (not shown), e.g., wood pellets, bagasse, switchblade and/or other grasses, wood, wood pellets or chips, peat, straw, and/or other suitable biofuels, in particular, dry biofuels, in accordance with embodiments as described herein is shown. The system 10 includes a combustion chamber 14, and may further include a controller 16 having at least one processor 18 and a memory device 20, a biomass feed assembly 22, a cleaner/filter 24, and/or an exhaust stack 26. As will be appreciated, the system 10 may form part of a power plant 28 where the combustion chamber 14 is incorporated into a boiler 30 which produces steam for various applications including, but not limited to, industrial processes or district heating or for the generation of electricity via a steam turbine generator 32.

As will be understood, the biomass feed assembly 22 is operative to receive and process the biofuel 12 in a hopper 50 for combustion within the combustion chamber 14, In some embodiments, the biomass feed assembly 22 may include a shredder (not shown) that shreds, pulverizes, and/or otherwise conditions the biofuel 12 for firing within the combustion chamber 14. The shredder may be a non-screened styled hammer mill integrated with a flash drying column disposed at the inlet of a beater wheel exhaust fan. In other embodiments, the biomass feed assembly 22 need not preprocess the biofuel 12, for example, with dry wood pellets.

Continuing with FIG. 1, the combustion chamber 14 is operative to receive and to facilitate combustion of the biofuel 12, which results in the generation of heat and a flue gas as shown by arrows 15, and hereinafter referred to as flue gas 15. The flue gas 15 may be sent from the combustion chamber 14 to the filter/cleaner 24 via conduit 36. In embodiments where the combustion chamber 14 is integrated into the boiler 30, the heat from combusting the biofuel 12 may be captured and used to generate steam, e.g., via water walls in heating contact with the flue gas 15, which is then sent to the steam turbine generator 32 via conduit 38. Advantageously flue gas having been recently combusted and filtered in filter/cleaner 24 is a heated flue gas 15 that is exhibits relatively inert properties with respect to combustion. That is, for example flue gas 15 typically may be on the order of 160° C. and have a remaining oxygen concentration of about 6%. Such a low oxygen concentration makes the flue gases 15 highly tolerant to any form of ignition, burning or explosion. Therefore, the recently combusted flue gases can be useful for inerting as described herein.

Figure 2:
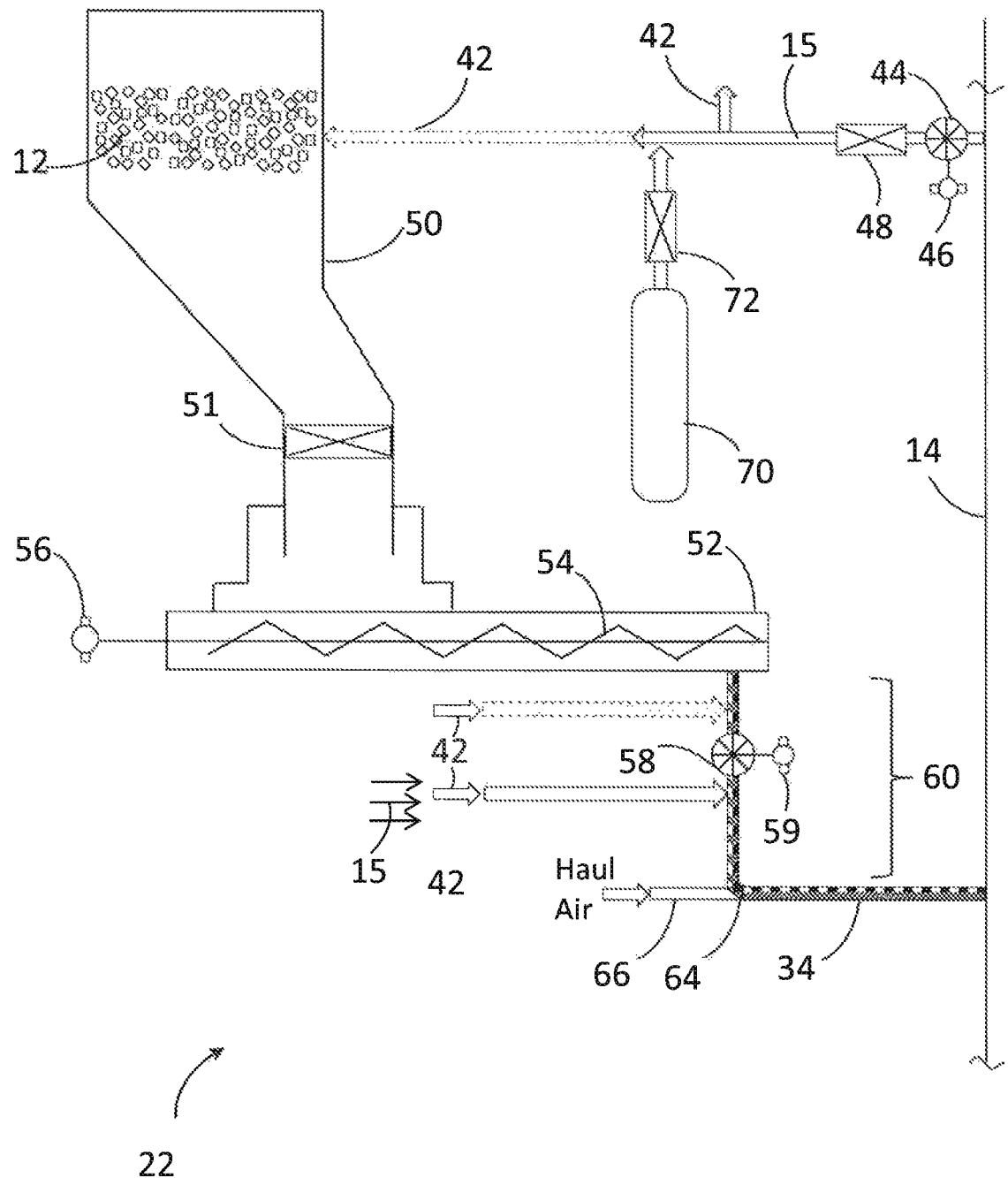
FIG. 2 is a in accordance with an embodiment of the invention.

Continuing with FIG. 1 and turning to FIG. 2 as well, depicting an expanded view of the biomass feed assembly 22 as may be employed in an embodiment. In another embodiment, the biomass feed assembly 22 is a spreader stoker style and includes a hopper 50, connected through a control damper 51 with an automated screw feeder 52. The screw feeder 52 includes an auger 54 operably connected to and driven by a motor 56. The screw feeder 52 advances the biofuel 12 to a gravity chute assembly 60. The gravity chute assembly 60 includes a rotary isolation valve 58 driven by motor 59. The rotary isolation valve 58 is configured to isolate the hopper 50 and screw feeder 52 from the gravity chute assembly 60 and prevent the propagation upstream of any shock waves from any blowback or flash back from downstream in the gravity chute assembly 60 and/or the combustion chamber 14. Thereafter, the biofuel 12 is mixed with blown-in flue gas 15 as described herein. Finally, the mixture of flue gases and biofuel 12 is directed to a pneumatic spreader 64 and haul air 66 which then blows the fuels into combustion chamber 14 directly; the fine fraction of the fuel blown into the combustion chamber 14 burns in the suspension phase whereas the coarser constituents are partly dried and/or ignited in suspension phase before falling on the grate and continuous to burn with the support of primary air (or grate air) supplied from the primary air plenums underneath the grate surface.

In an embodiment conduit 42 is operably connected to the biomass feed assembly 22 and specifically at least the gravity chute assembly 60 thereof. The conduit 42 carries flue gases 15 (or inerting gases) from the combustion chamber 14 and conduit 40 to the biomass feed assembly 22 and at least the gravity chute assembly 60 thereof. In an embodiment a blower 44 driven by a motor 46 is employed to direct the flue gas 15 from the combustion chamber 14 to the biomass feed assembly 22, and more specifically the gravity chute assembly 60, where it is mixed with the biofuel 12 therein. The blower 44 ensures that a positive pressure and flow of the flue gas 15 is maintained to the biomass feed assembly 22, and more specifically, the gravity chute assembly 60. In some embodiments the positive pressure of the combustion chamber 14 ensures the flow of flue gases 15 without the added blower 44. In another embodiment, a flow control valve 48 is employed to control the flow of flue gases to the biomass feed assembly 22 and in particular the gravity chute assembly 60. In an embodiment, a continuous flow of recirculated flue gas 15 is supplied to at least the gravity-chute assembly 60 at a rate controlled by the operation of the blower 44 and flow control valve 48. The supplied flue gas 15 or inert gas flow ensures an inert atmosphere in the gravity-chute assembly 60 by constantly sweeping any generated dust away, downstream to the combustion chamber 14 for combustion. At the same time, the introduction of flue gases 15 to the gravity chute 60 suppresses the oxygen partial pressure or concentration inside the gravity-chute assembly 60 upstream the spreader spout 64 to an inerted, non-explosive level. In an embodiment, the oxygen concentration in at least the gravity chute assembly 60 is reduced to below at least 12%. In another embodiment, the oxygen concentration in at least the gravity chute assembly 60 is reduced to below about 7%-8%.

In another embodiment, in addition to, or as an alternative to that described above, conduit 42 is connected to the gravity chute assembly 60 above the isolation valve 58. In an embodiment, once again, as described herein, a continuous flow of recirculated flue gas 15 is supplied to the gravity-chute assembly 60 at a rate controlled by the operation of the blower 44 and flow control valve 48 above the isolation valve 58. The supplied flue gas 15 or inert gas flow ensures an inert atmosphere in the gravity-chute assembly 60 by constantly sweeping any generated dust away, downstream to the combustion chamber 14 for combustion as described herein.

In another embodiment, in addition to, or as an alternative to that described above, conduit 42 is connected to the hopper 50. In this embodiment, blower 44 and flow control valve 48 are employed to control the flow of flue gases to the biomass feed assembly 22 and to the hopper 50. In an embodiment, a continuous flow of recirculated flue gas 15 is supplied to the hopper 50 at a rate controlled by the operation of the blower 22 and flow control valve 48. The supplied flue gas 15 or inert gas flow ensures an inert atmosphere in the hopper and screw feeder 52 by constantly sweeping any generated dust away, downstream to the gravity chute 60 and on to the combustion chamber 14 for combustion. At the same time, the introduction of flue gases 15 to the hopper 50 suppresses the oxygen partial pressure or concentration inside the hopper 50 upstream of the gravity chute assembly 60 to an inerted, non-explosive level. In an embodiment, the oxygen concentration in at least the hopper 50 is reduced to below at least 12%. In another embodiment, the oxygen concentration in at least the hopper 50 is reduced to below about 7%-8%.

In another embodiment instead of employing flue gases 15, and injecting flue gas 15 in the gravity chute assembly 60, inert gases or steam are injected directly into the biomass feed assembly 22, and, in particular, the gravity chute assembly 60. For example, in an embodiment, inert gas storage 70 may be employed to store inert gas, e.g., nitrogen or a nitrogen composition, carbon dioxide and the like as well as flame suppressors such as MAP (monoammonium phosphate), sodium bicarbonate or other equivalent flame retarding composition, employed for ignition suppression. A flow control valve 72 may be employed to control the flow of inert gas from the storage 70 to the biomass feed assembly, 22 and in an embodiment, the gravity chute assembly 60. Advantageously when inert gases are employed, the oxygen partial pressure or concentration is reduced to levels low enough to reduce or eliminate any risk of ignition as described herein.

Figure 3:
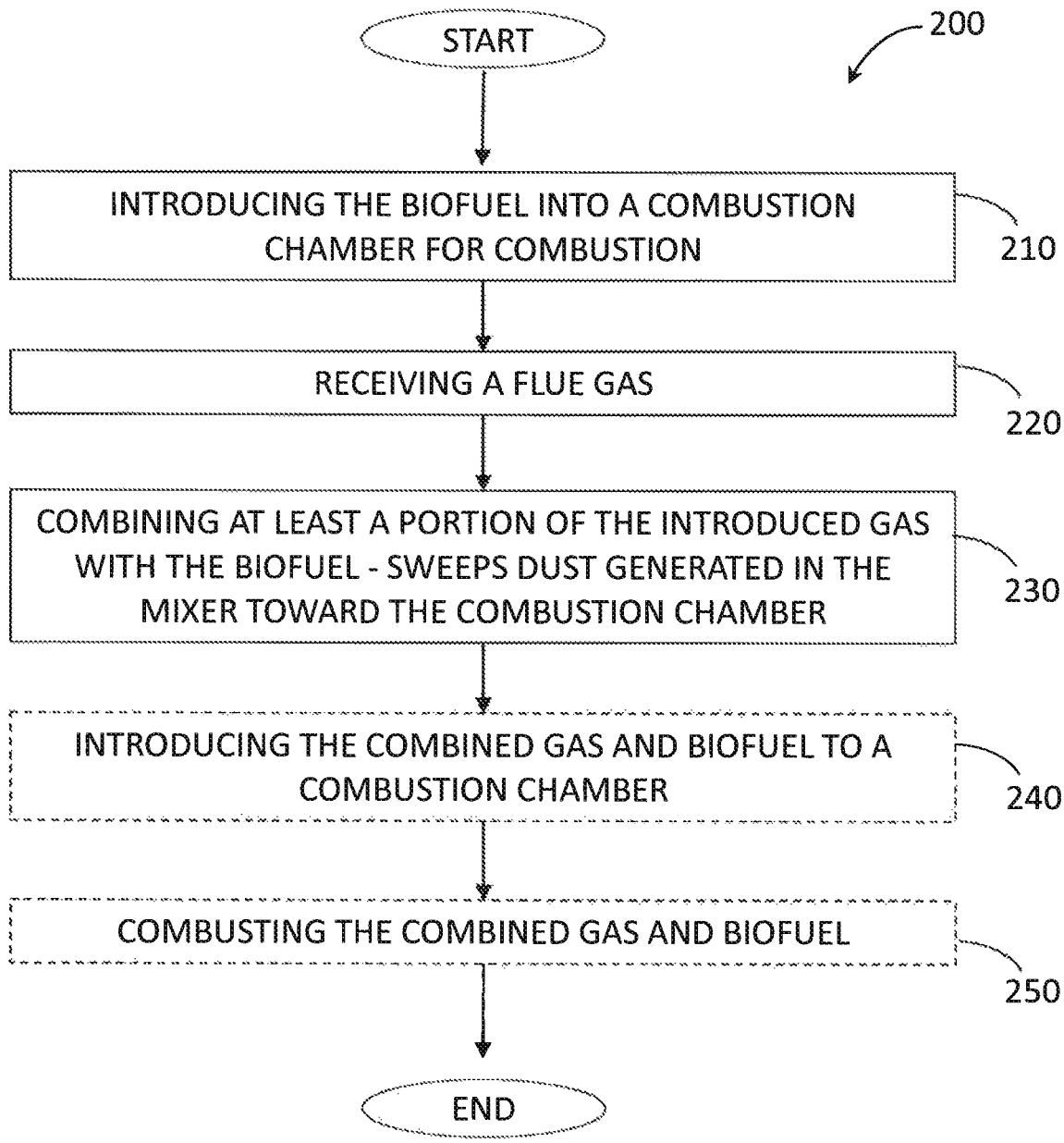
FIG. 3 is a flow chart describing a method of operation for inerting a biofuel feed assembly in accordance with an embodiment of the invention.

Turning now to FIG. 3 as well for a description of a method 200 of operation for inerting biofuel feed assembly 22 and in particular a gravity chute assembly 60 thereof, in accordance with an embodiment. In an embodiment a control system is implemented to control the operation of the biomass feed assembly 22 and combustion system 14 and more specifically the blower 44 and flow control valves 48, 72 to direct inerting gas to at least the gravity chute assembly 60 of the biomass fuel assembly 22, and the like to execute the described methodologies. In an embodiment such control functions may be implemented in wholly or in part in controller 16 or in another controller. In an embodiment multiple modes of operation are envisioned. It should be appreciated that while several modes of operation are described, such description in only for the purpose of example. Various other and additional modes of operation may readily be envisioned and it should be well understood that variations and other modes operation are possible.

Continuing with FIG. 3, and the method 200, to initiate the process as described, biofuel 12 is introduced to the feeder 22, at process step 210, and a flue gas is received at process step 220 at at least one of the gravity chute assembly 60, an output of the screw feeder 52, or at the hopper 50, and particularly at least to the gravity chute assembly 60. In an embodiment, and for the purpose of example the biofuel may be dry, and as a result disposed to producing dust as it is processed through the biomass feed assembly 22. The method 200 continues at process step 230 with at least a portion of the flue gas 15 being combined with the biofuel 12 (including any dust) in the gravity chute assembly 60. In an embodiment the gas is intended to sweep any potential dust through the chute 60 to the spreader, to minimize any accumulation of the dust, which could result in potential harmful conditions. A gas denoted haul air is introduced to the feeder-pneumatic spreader 64 as well to facilitate the spreading and combustion. Continuing with the methodology 200. At process step 240, the combined gas and biofuel are introduced to the combustion chamber 14 were they are combusted as depicted in process step 250. The combusted combined gas and biofuel generates flue gases in the combustion chamber 14 and the process reiterates.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be executed in real-time. For example, as stated above, the system 10 may include at least one processor 18 and system memory/data storage structures 20 in the form of a controller 16 that electrically communicates with one or more of the components of the system 10. The memory may include random access memory ("RAM") and read-only memory ("ROM"). The at least one processor may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for control over one or more of the various components of the system 10 may be read into a main memory of the at least one processor from a computer-readable medium. The term "computer-readable medium," as used herein, refers to any medium that provides or participates in providing instructions to the at least one processor 18 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes the at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, described herein, in an embodiment is a system for inerting a biomass feed assembly. The system includes a biomass feed assembly having a biofuel a combustion chamber operably connected to the biomass feed assembly to receive the biofuel, the combustion chamber operable to combust the biofuel and generate a flue gas therefrom and a conduit operably coupled to at least one of the combustion chamber and an inert gas source, and the biomass feed assembly. In addition to one or more of the features described above, or as an alternative, further embodiments may include, that at least one of an inert gas or the flue gases generated by combustion in the combustion chamber are introduced to the biomass feed assembly and mixed with the biofuel. Furthermore, in addition to one or more of the features described above, or as an alternative, further embodiments may also include, that the gas sweeps dust generated in at least a portion of the biomass feed assembly toward the combustion chamber. Moreover, further embodiments may include one or more of the features described above, or as an alternative, that the gas maintains an oxygen partial pressure or concentration in the at least a portion of the biomass feed assembly below a selected threshold sufficient to suppress ignition.

In addition to one or more of the features described above, or as an alternative, further embodiments may include, that the gas includes at least one of a flue gas, an inerting gas, and steam.

In addition to one or more of the features described above, or as an alternative, further embodiments may include, that the flue gas is generated by combusting at least one of the biofuel, and the combined gas and the biofuel.

In addition to one or more of the features described above, or as an alternative, further embodiments may include, a blower operably coupled to the conduit to direct the gas to the mixer.

In addition to one or more of the features described above, or as an alternative, further embodiments may include, that the blower is controlled to maintain a positive partial pressure in at least a portion of the biofuel feeder.

In addition to one or more of the features described above, or as an alternative, further embodiments may include a flow control valve operably connected to the conduit, the flow control valve operable to control a flow of gas to the biofuel feeder In addition to one or more of the features described above, or as an alternative, further embodiments may include, that the selected threshold is less than at least one of 14%, 8% and 7%.

In addition to one or more of the features described above, or as an alternative, further embodiments may include, that the biofuel is at least one of bagasse, wood, peat, straw, and grass.

In addition to one or more of the features described above, or as an alternative, further embodiments may include, that the at least a portion of the biomass feed assembly comprises at least one of the gravity chute feeder downstream of an isolation valve, the gravity chute feeder upstream of the isolation valve, a hopper of the biomass feed assembly, and a screw feeder of the biomass feed assembly.

In addition to one or more of the features described above, or as an alternative, further embodiments may include that the inert gas source is at least one of compressed nitrogen or a nitrogen composition, carbon dioxide and the like as well as flame suppressors such as MAP (monoammonium phosphate), sodium bicarbonate in a storage bottle.

Furthermore, in another example, in an embodiment, disclosed herein is a method of inerting a biofuel in biomass feed assembly operably connected to a combustion chamber. The method includes receiving an inerting gas at the biomass feed assembly, injecting the inerting gas with the biofuel in at least a portion of the biomass feed assembly. Furthermore, in addition to one or more of the features described above, or as an alternative, further embodiments may also include, that the gas sweeps dust generated in at least a portion of the biomass feed assembly toward the combustion chamber. Moreover, further embodiments may include one or more of the features described above, or as an alternative, that the gas maintains an oxygen partial pressure or concentration in the at least a portion of the biomass feed assembly below a selected threshold sufficient to suppress ignition.

In addition to one or more of the features described above, or as an alternative, further embodiments of the method may include the gas includes that the gas is at least one of a recirculated flue gas, an inerting gas, and steam.

In addition to one or more of the features described above, or as an alternative, further embodiments of the method may include that the combusting generates a flue gas based at least in part on at least one of the biofuel, and the combined gas and the biofuel.

In addition to one or more of the features described above, or as an alternative, further embodiments of the method may include that the receiving includes employing a blower to direct the gas to the biomass feed assembly.

In addition to one or more of the features described above, or as an alternative, further embodiments of the method may include controlling the blower to maintain a positive partial pressure in at least a portion of the biomass feed assembly.

In addition to one or more of the features described above, or as an alternative, further embodiments of the method may include controlling a flow of gas into at least a portion of the biomass feed assembly.

In addition to one or more of the features described above, or as an alternative, further embodiments of the method may include that the controlling is based on a flow control valve that regulates the flow of gas into the biomass feed assembly.

In addition to one or more of the features described above, or as an alternative, further embodiments of the method may include that the at least a portion of the biomass feed assembly comprises at least one of the gravity chute feeder downstream of an isolation valve, the gravity chute feeder upstream of the isolation valve, a hopper of the biomass feed assembly, and a screw feeder of the biomass feed assembly.

In addition to one or more of the features described above, or as an alternative, further embodiments of the method may include that the selected threshold is less than at least one of 14%, 8% and 7%.

In addition to one or more of the features described above, or as an alternative, further embodiments of the method may include the biofuel is at least one of bagasse, wood pellets, wood chips, peat, straw, and grass.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they are by no means limiting and are exemplary embodiments. Many other embodiments will be apparent to those of skill in the art upon reviewing the above description. The scope of the invention should, therefore, be determined with reference to the appended claims. Such description may include other examples that occur to one of ordinary skill in the art and such other examples are intended to be within the scope of the claims if they have structural elements that do not differ from the literal language of the claims, or if they include equivalent structural elements with insubstantial differences from the literal languages of the claim.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

What is claimed is:

1. A method of inerting a biofuel in a biomass feed assembly operably connected to a combustion chamber, the biomass feed assembly having a hopper to receive the biofuel, a screw feeder to receive and advance the biofuel from the hopper, a gravity chute assembly to receive the biofuel from the screw feeder, a rotary valve to isolate a portion of the gravity chute assembly from the hopper and the screw feeder and to provide the biofuel from the screw feeder to the gravity chute assembly, and a pneumatic spreader to distribute the biofuel to the combustion chamber, the hopper, the screw feeder, the rotary valve and the gravity chute assembly all spaced apart from the combustion chamber without directly contacting a surface thereof, the method comprising:
providing the biofuel from the hopper to the gravity chute assembly via the screw feeder and the rotary valve;
supplying the biofuel from the gravity chute assembly to the combustion chamber via the pneumatic spreader;
injecting a gas into the gravity chute assembly while supplying the biofuel to the combustion chamber, the injecting of the gas into the gravity chute assembly including one or more of:
injecting the gas into a portion of the gravity chute assembly that is downstream of the rotary valve,
injecting the gas into a portion of the gravity chute assembly that is upstream of the rotary valve, and
injecting the gas into a portion of the biomass feed assembly that is upstream of the gravity chute assembly, the portion of the biomass feed assembly including the hopper, and the screw feeder of the biomass feed assembly;
sweeping dust generated by the biofuel in the gravity chute assembly towards the combustion chamber with the gas; and
maintaining, with the gas, an oxygen partial pressure or concentration in the gravity chute assembly below a selected percentage threshold applicable for both oxygen partial pressure and oxygen concentration while sweeping the dust towards the combustion chamber to suppress ignition, explosion, flashback and backfire in the gravity chute assembly during combustion of the biofuel in the combustion chamber.

2. The method of claim 1, wherein the gas includes at least one of a recirculated flue gas, an inerting gas and steam.

3. The method of claim 1, further comprising:
generating a flue gas based on at least one of the biofuel, and a combination of the gas and the biofuel.

4. The method of claim 1, wherein the injecting includes employing a blower to direct the gas to the gravity chute assembly.

5. The method of claim 4, further comprising:
controlling the blower to maintain a positive partial pressure in at least a portion of the biomass feed assembly.

6. The method of claim 1, further comprising:
controlling a flow of the gas into the gravity chute assembly.

7. The method of claim 6, wherein the controlling is based on a flow control valve that regulates the flow of the gas into the gravity chute assembly.

8. The method of claim 1, wherein the selected percentage threshold is less than 14%, 8% or 7%.

9. The method of claim 1 wherein the biofuel is at least one of bagasse, wood, wood pellets, wood chips, peat, straw, and grass.

10. A system, comprising:
a biomass feed assembly including a hopper that receives a biofuel, a screw feeder to receive and advance the biofuel from the hopper, a gravity chute assembly that obtains the biofuel received by the hopper, a rotary valve to isolate a portion of the gravity chute assembly from the hopper and the screw feeder and to provide the biofuel from the screw feeder to the gravity chute assembly, and a pneumatic spreader to receive and distribute the biofuel from the gravity chute assembly;
a combustion chamber operably connected to the biomass feed assembly to receive the biofuel from the gravity chute assembly via the pneumatic spreader, the combustion chamber operable to combust the biofuel and generate a flue gas therefrom, wherein the hopper, the screw feeder, the rotary valve and the gravity chute assembly are all spaced apart from the combustion chamber without directly contacting a surface thereof;
a conduit operably coupled to the gravity chute assembly and at least one of the combustion chamber and an inert gas source having an inerting gas, the conduit operable to inject a gas into the gravity chute assembly, wherein the conduit injects the gas into one or more of:
- a portion of the gravity chute assembly that is downstream of the rotary valve,
- a portion of the gravity chute assembly that is upstream of the rotary valve, and
- a portion of the biomass feed assembly that is upstream of the gravity chute assembly, the portion of the biomass feed assembly including the hopper, and the screw feeder of the biomass feed assembly; and wherein dust generated by the biofuel in the gravity chute assembly is swept towards the combustion chamber with the gas; and wherein the gas maintains an oxygen partial pressure or concentration in the gravity chute assembly below a selected percentage threshold applicable for both oxygen partial pressure and oxygen concentration while sweeping the dust towards the combustion chamber to suppress ignition, explosion, flashback and backfire in the gravity chute assembly during combustion of the biofuel in the combustion chamber.

11. The system of claim 10, wherein the gas includes at least one of the flue gas, the inerting gas, and steam.

12. The system of claim 10, wherein the flue gas is generated by combusting at least one of the biofuel, and the combined gas and the biofuel.

13. The system of claim 10, further comprising:
a blower operably coupled to the conduit to direct the gas to the gravity chute assembly.

14. The system of claim 13, wherein the blower is controlled to maintain a positive partial pressure in at least a portion of the biomass feed assembly.

15. The system of claim 10, further comprising:
a flow control valve operably connected to the conduit, the flow control valve operable to control a flow of the gas to the gravity chute assembly.

16. The system of claim 10, wherein the selected percentage threshold is less than 14%, 8%, or 7%.

17. The system of claim 10, wherein the biofuel is at least one of bagasse, wood, wood pellets, wood chips, peat, straw, and grass.

18. The system of claim 10, wherein the inerting gas is at least one of compressed nitrogen, a nitrogen composition, carbon dioxide, a flame suppressor, MAP (monoammonium phosphate), and sodium bicarbonate.

* * * * *